United States Patent [19]
Straayer

[11] Patent Number: 6,084,998
[45] Date of Patent: Jul. 4, 2000

[54] SYSTEM AND METHOD FOR FABRICATING DISTRIBUTED BRAGG REFLECTORS WITH PREFERRED PROPERTIES

[75] Inventor: Ron Straayer, Utica, Mich.

[73] Assignee: Alpha and Omega Imaging, LLC, South Windsor, Conn.

[21] Appl. No.: 09/222,650

[22] Filed: Dec. 30, 1998

[51] Int. Cl.[7] .................................................. G02B 6/34
[52] U.S. Cl. ............................ 385/37; 385/33; 385/36; 385/123; 359/572; 430/290
[58] Field of Search ................................... 385/31, 33, 36, 385/37, 123, 124; 372/6, 102; 359/572, 575; 430/290, 321, 394

[56] References Cited

U.S. PATENT DOCUMENTS

| | | | |
|---|---|---|---|
| 4,807,950 | 2/1989 | Glenn et al. | 385/37 |
| 5,218,655 | 6/1993 | Mizrahi | 385/39 |
| 5,309,260 | 5/1994 | Mizrahi et al. | 359/3 |
| 5,309,560 | 5/1994 | Abe et al. | 395/166 |
| 5,388,173 | 2/1995 | Glenn | 385/37 |
| 5,625,472 | 4/1997 | Mizrahi et al. | 359/34 |
| 5,629,998 | 5/1997 | Cook et al. | 385/37 |
| 5,694,248 | 12/1997 | Erdogan et al. | 359/570 |
| 5,708,738 | 1/1998 | Perez et al. | 385/37 |
| 5,822,479 | 10/1998 | Napier et al. | 385/37 |
| 5,898,804 | 4/1999 | Wickham | 385/37 |

*Primary Examiner*—Hemang Sanghavi
*Attorney, Agent, or Firm*—Alix, Yale & Ristas, LLP

[57] ABSTRACT

Optical media is imaged by a combination of components for splitting a coherent beam into two co-propagating optical beams; converging the optical beams to produce a pattern of interference fringes having a pitch; varying the pitch and/or amplitude of the interference pattern fringes; axially rotating the fringes around the media; and axially rotating the co-propagating optical beams so as to maintain rotary synchronism with the axially rotating fringes as the permanent fringes are formed in the media whereby the longitudinal index of refraction is modulated along the media preferably with circular symmetry. The media is positioned as a work piece along a workpiece axis, with some of the system components translated along and/or rotated about the workpiece axis. Independently variable design parameters can, according to the preferred control system, be specified in advance with a high degree of flexibility.

20 Claims, 11 Drawing Sheets

SYSTEM AND METHOD FOR FABRICATING DISTRIBUTED BRAGG REFLECTORS WITH PREFERRED PROPERTIES

FIELD OF THE INVENTION

The present invention pertains to passive optical filters formed with Bragg gratings and an innovative and preferred imaging technique for the fabrication of such devices. These devices when applied to other waveguide propagation articles such as optical fibers are used broadly in the fields such as telecommunication and remote sensing.

BACKGROUND

This invention concerns devices known as DBR's (distributed Bragg reflectors) and the techniques and equipment used to manufacture such devices. DBR's are optical fibers or other media that have been modified by modulating the longitudinal index of refraction of the fiber core, cladding or both to form a pattern. This pattern is generally known as a Bragg grating or image. A fiber equipped Bragg grating functions to modify the optical passband of the fiber (transmission characteristic) in such a way as to only transmit a narrow and controlled wavelength band.

Such DBR is typically a "lossless" device. That is, the sum of the optical transmission and reflection is unity for all wavelengths of interest. A telecommunication system equipped with DBR's can divide a single fiber into multiple channels (40, 80, or more) by dividing the full passband of the fiber into discrete channels which are assigned to specific wavelengths. An optical fiber laser having a DBR terminated optical cavity is described by G. A. Ball and W. W. Morey in "Continuously Tunable Single-Mode Erbium Fiber Laser", *Optics Letters,* 17 (1992) pp.420–422.

These DBR's are very useful in fiber-based telecommunications because of their high selectivity to wavelength (channel selection), their stability, and their packaging factor that allows them to directly couple to the telecommunications fiber and its pump amplifiers. Such a system which use DBR's for pump radiation reflection in a telecommunication application with optical pumping via doped fiber amplifiers is described in U.S. Pat. No. 5,218,655 (Mizrahi, et al). Remote sensing systems with DBR's use the passive and very sensitive nature of the DBR passband characteristics to sense various physical phenomenons (temperature, pressure, vibration, chemical content, etc.).

DBR devices are fabricated by exposure to "actinic" radiation in an appropriate spectral range (typically UV) much like photoresists and the like. This actinic exposure causes the index of refraction to permanently change in the exposed portion of the medium (i.e.,the core or cladding of the optical fiber. A period pattern can be formed on the surface of the fiber by superimposing two optical beams and forming an optical interference pattern. Two intersecting beams form a pattern whose grating period (distance between maxima) is given by $\Lambda=\lambda/((2*\sin(\phi/2))$ where $\lambda$ is the optical wavelength and $\phi$ is the angle between the beams. Sufficient exposure to UV radiation in such an interference pattern will produce a Bragg grating within a fiber and thereby, a DBR. A technique for fabricating such DBR's is described in U.S. Pat. No. 4,807,950 (Morey, et al).

DBR's fabricated with this technique are limited by several factors. First, the grating spacing is periodic. It is well known that quasiperiodic gratings (specifically "chirped" gratings) have preferred properties in certain applications. A chirped grating is a grating where the grating period changes (increases or decreases) monotonically down the fiber. Chirped gratings are useful in making broadband optical reflectors. Additionally, chirped gratings can be useful in removing undesirable wavelengths (and signals) as described in U.S. Pat. No. 5,625,472 (Mizrahi, et al).

U.S. Pat. No. 5,309,260 teaches that the normal exposure of DBR's made with the technique of U.S. Pat. No. 4,807,950 will suffer from exhibiting one or more subsidiary peaks or a regularly spaced series of peaks which may adversely affect the operation of telecommunication systems or remote sensing systems with active wavelength stabilization.

DBR fabrication techniques according to U.S. Pat. Nos. 4,807,950; 5,309,560; 5,388,173; 4,807,950; 5,625,472, and 5,694,248 all teach lateral imaging of the fiber. This lateral exposure has the effect of inducing a polarization birefringence in the fiber that is undesirable. Furthermore, these are inherently incompatible with specialty fibers such as tapered index fibers which may require further non-linearities in the grating period and index change profile as a function of the longitudinal position down the fiber. These DBR fabrication techniques are also highly labor intensive, subject to high levels of "trial and error", and therefore unsuited for high production environments. DBR's produced with these methods are, therefore, of low yield and must be subject to stringent quality control testing.

Known DBR fabrication techniques do not afford the DBR designer automatic and arbitrary control over the transmission and phase response characteristics of the imaging system for rapid production of custom DBR's.

SUMMARY OF THE INVENTION

The present invention includes a number of improvements that overcome these and other deficiencies with an imaging system that in the preferred embodiment:

1. Allows the user wide control of the fringe spacing along the grating;
2. Allows the user wide control of the fringe amplitude along the grating;
3. Includes an interactive design station which defines the fringe spacing and amplitude characteristics in response to a user selected transmission target;
4. Is capable of producing DBR's in a "reel-to-reel" production environment;
5. Is capable of producing DBR's of different characteristics automatically;
6. Produces DBR's without tooling; and
7. Produces DBR's without birefringence.

In a broad system aspect of the invention, optical media is imaged by a combination of components including means for splitting a coherent beam into two co-propagating optical beams; means for converging the optical beams to produce a pattern of interference fringes having a pitch; means for varying the pitch of the interference pattern fringes; means for axially rotating the fringes around the media; and means for axially rotating the co-propagating optical beams so as to maintain rotary synchronism with the axially rotating fringes as the permanent fringes are formed in the media. Preferably, the system includes means for linearly translating the means for splitting, the means for converging, the means for rotating the fringes, and the means for rotating the optical beams, parallel to the grating direction. In this manner, relatively narrow interfering beams produce a relatively short length of fringes which can be "marched along" the media to produce a complete, relatively long fringe group, with varying properties.

In a preferred system and associated method for modulating the longitudinal index of refraction along an optical fiber that is positioned as a work piece along a workpiece axis, a source of actinic light is modulated to generate a beam having a known amplitude. The beam of modulated light is passed through a phase mask or similar component having the nominal pitch of the desired modulations to be formed in the fiber. From the beam passing through the phase mask or the like, at least two diffracted beams of nominally equal intensity are generated. All additional diffracted orders and the "zero" or undiffracted beams are blocked, (except the plus one and minus one order). From the blocked diffracted beams, two collimated beams having a predetermined cross sectional shape, and a nominal separation distance are folded with a tiltable mirror or the like, to travel in a direction substantially parallel to the workpiece. The folded collimated beams are passed through a prism assembly or the like that is nominally centered on and is rotatable about the workpiece axis such that at any rotational angle about the workpiece axis the collimated beams emerge from the prism assembly with a nominal separation distance or gap between them. The optical fiber is fed through the gap and into a recording head assembly which surrounds the fiber, folds the collimated beams to project perpendicularly to the fiber, and focuses the beams within the fiber. The fiber is clamped on the workpiece axis and the phase mask, the prism assembly, and the recording head assembly are co-translated parallel to the workpiece axis. The prism assembly and the recording head assembly are co-rotated at different angular velocities (in ratio 1:2), thereby maintaining rotary synchronism of the beams in the recording head assembly with the beams in the prism assembly. Preferably, the rate and distance of translation of the phase mask assembly, the prism assembly and recording head assembly; the angular velocities of rotation of the prism and the recording head; the amplitude of the modulated beam; and the degree of tilt of the tiltable mirror, are all independently variable during the modulation of fringe grid pattern in the optical fiber.

The independently variable parameters identified immediately above, can, according to the preferred control system of the present invention, be specified in advance with a high degree of flexibility. For example, a plurality of identical, axially spaced apart gratings can be produced, followed by a plurality of gratings which have a very different design, all without human intervention or stoppage of the fabrication process. Moreover, the flexibility includes fabrication of a plurality of gratings, each of which is different from the other. As a final level of flexibility, within a grating pattern, the characteristics of individual fringe/zones can differ, according to a predetermined plan or design. Another advantage of the control system is that the settings for a particular grating pattern can be stored and readily retrieved for duplicating gratings which may have been fabricated at a considerably earlier time.

In a broad method embodiment for imaging light transmitting media oriented along a workpiece axis by directing two co-propagating coherent light beams having known beam amplitudes and beam pitch at the media transversely to the workpiece axis so that the beams interfere to produce a fringe pattern in the media having a commensurate fringe amplitude and fringe pitch, the improvement according to the present invention comprises as a first step, directing the co propagating coherent beams parallel to the workpiece axis. The beams are then redirected from a direction parallel to the workpiece axis to a direction perpendicular to the workpiece axis while maintaining the beam pitch. The beams are further redirected from a direction perpendicular to the workpiece axis to respective converging directions whereby the beams interfere to produce the fringe pattern in the media. The coherent beams and the converging beams are synchronously rotated about the workpiece axis while the rotating beams are translated relative to the media in parallel with the workpiece axis, thereby producing permanent fringes in the media, preferably having circular symmetry. This method permits amplitude control and, independently, pitch control of the fringes.

The foregoing novel method also permits the fabrication of novel optical fibers, in that the modulations of the longitudinal index of refraction of the fiber, are substantially circularly symmetric about the longitudinal axis of the fiber.

In particular, a passive optical filter can be fabricated, comprising a core of material having a first nominal index of refraction, and a cladding of material having a second nominal index of refraction, which surrounds the core and extends concentrically therewith along a longitudinal axis of the optical filter. A Bragg grating is imaged in the core, and defined by a series of longitudinally spaced fringes/zones, each fringe/zone located at a fixed longitudinal position in the core and having a measurably different index of refraction than the nominal index, wherein each fringe/zone is circularly symmetric about the longitudinal axis.

The invention further permits the fabrication of Bragg gratings formed in optical wave guide media that exhibit properties of a main wavelength transmission region and a secondary transmission region with a small additional sideband at the low wavelength and high wavelength side respectively.

Practitioners in this field of technology can readily appreciate that the present invention affords greater flexibility in design, and more efficient fabrication, than is currently available. Moreover, the fringes or zones constituting the grating, can be fabricated with circular symmetry, with great ease, thereby producing DBRs which do not exhibit birefringences.

BRIEF DESCRIPTION OF THE DRAWINGS

The preferred embodiments and other objects and advantages of the invention will be described below with reference to the accompanying drawings wherein.

DESCRIPTION OF THE PREFERRED EMBODIMENTS

Figure 1:
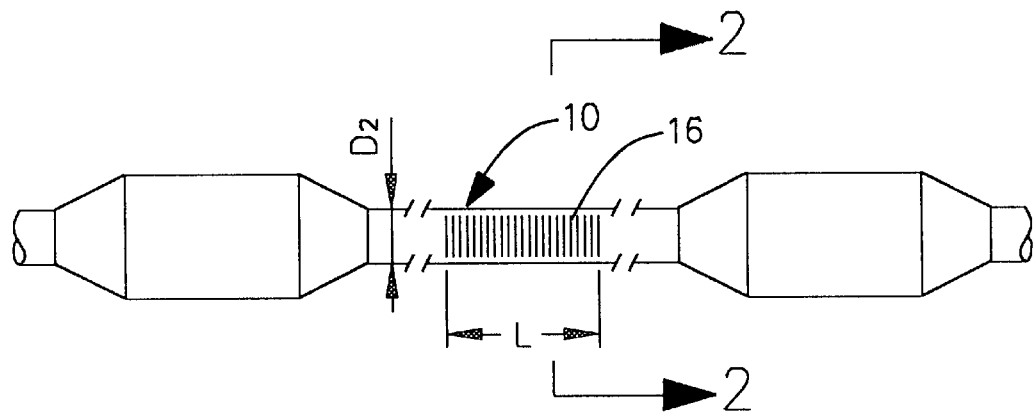
FIG. 1 is a schematic representation of a DBR device installed between two optical fibers.

FIGS. 1–4 show a DBR device 10 which in a typical end use, consists of a core 12 having a diameter D1 of approximately 5 microns, and a first nominal optical index of refraction ($\eta_1$=1.46), surrounded by a cladding 14 having an outer diameter $D_2$ of approximately 125 microns, and a second nominal index of refraction ($\eta_2$=1.45). The device may be on the order of several centimeters in length, but the Bragg grating 16 typically extends along the longitudinal axis of the device, for a distance L of 6–10 mm. Conventionally, the pitch $\Lambda$, i.e., distance between fringe maxima 18a,18b, is on the order of 0.5 micron. Thus, a DBR grid according to the present invention, can have from 12,000 to 20,000 fringes formed along length L, preferably with varying amplitude and pitch as will be described in greater detail below.

Figure 3:
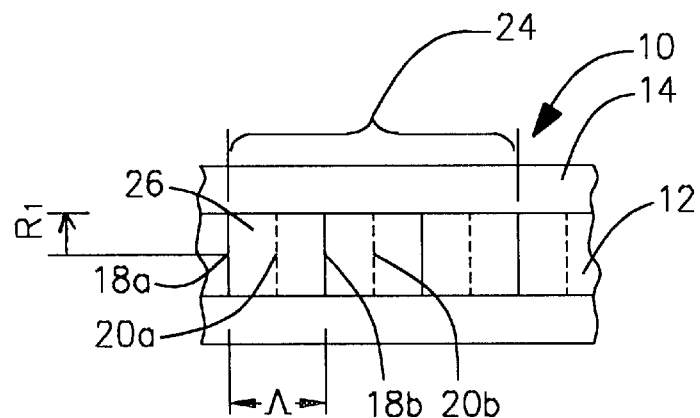
FIG. 3 is an enlarged view of the portion of the core and surrounding cladding, showing in diagrammatic form, the fringe maxima and minima forming part of the fringe pattern in the grating of FIG. 1.

As is known conventionally, actinic beams directed at an angle α to the perpendicular passing through a fiber, interfere constructively and destructively to form respective fringe maxima 18a, 18b and fringe minima 20a,20b at the surface of (and penetrating into) the fiber core. If the raw or nominal index $\eta_1$ of the core is 1.460000, the fringe maxima will have indexes of, for example, 1.460080 to 1.460090, whereas the fringe minima will have indexes that are much closer to the raw or nominal index of 1.46000. As depicted in FIG. 3, the maxima 18 and minima 20 are spaced axially by one half of the fringe pitch. The index variation as one moves in the axial direction between the maxima and minima, is not necessarily sinusoidal, but zones of high index are measurably different from the nominal so that individual fringe regions or zones 18a,18b are identifiable.

Figure 2:
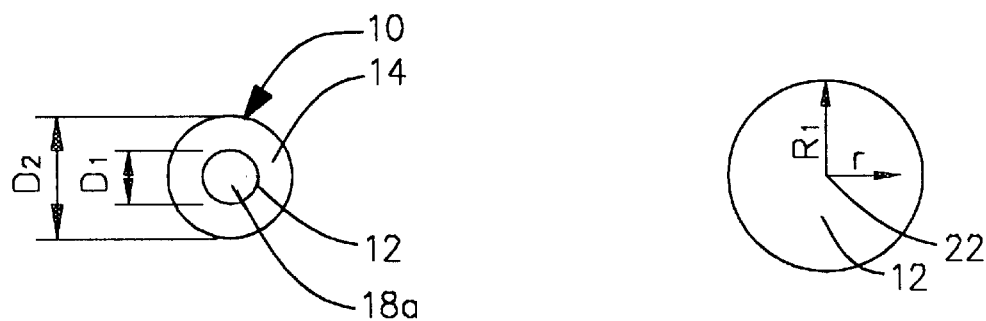
FIG. 2 is a section view of the DBR device, taken through a fringe maximum along line 2—2 of FIG. 1.
Figure 4:
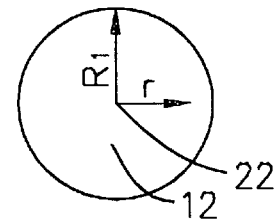
FIG. 4 is a cross-section view of the core portion of the DBR device of FIG. 2, having a radius $R_1$.
Figure 5:
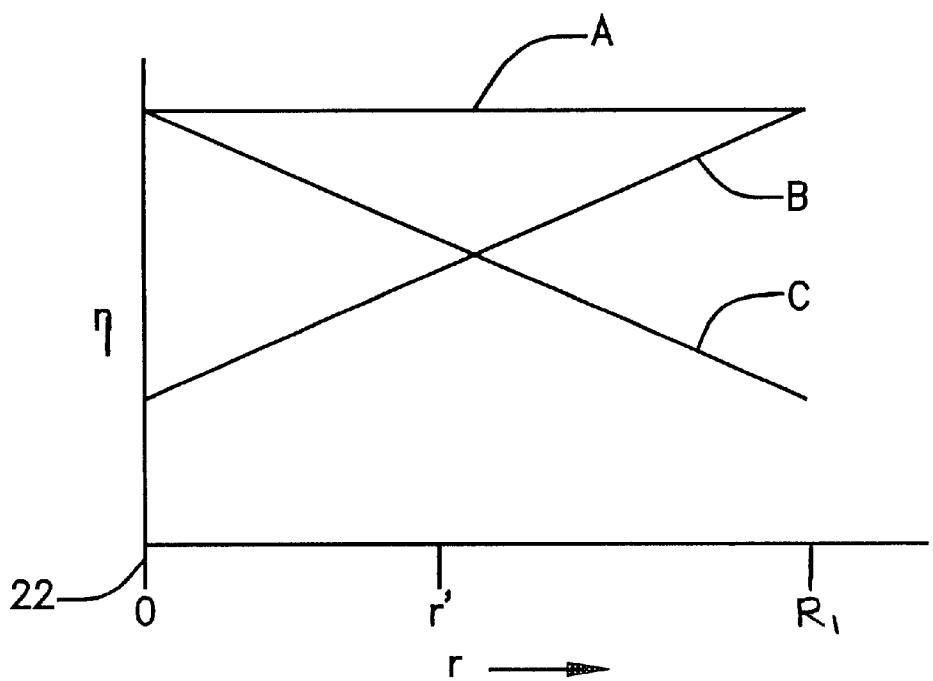
FIG. 5 is a graphic representation of monotonic variations in the index of refraction of each zone in the core, as a function of the radial distance from the longitudinal axis to the radius $R_1$.
Figure 6:
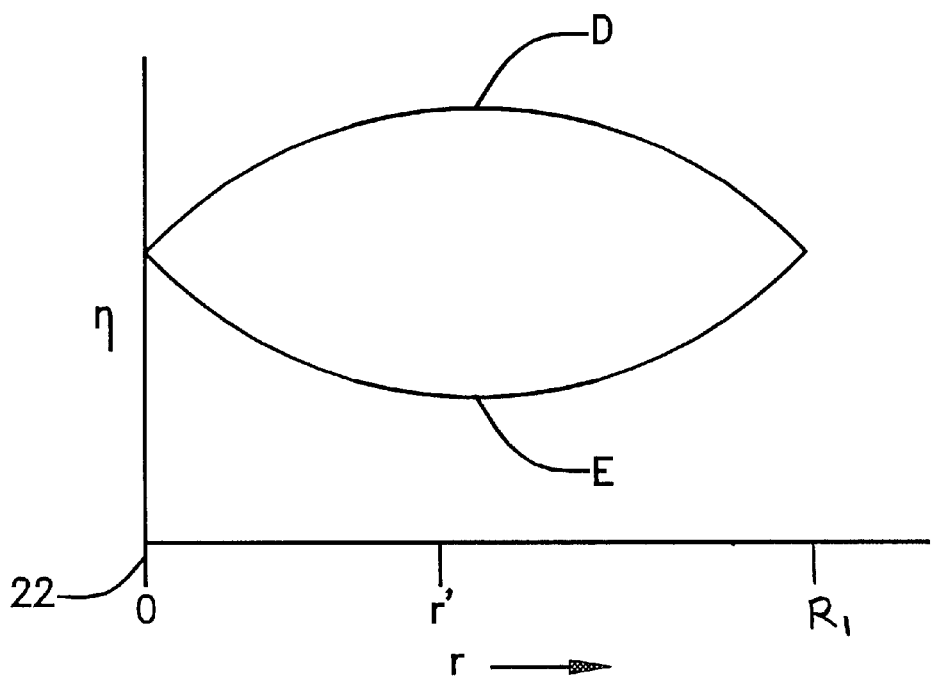
FIG. 6 is a graphic representation of more complex variations of the index of refraction as a function of radial distance from the longitudinal axis.

Whereas conventionally, these fringe maxima are located within, for example, about one quadrant of the cross-section of a fiber core, according to the present invention as shown in FIG. 2, these fringes 18a can be formed circularly symmetric, i.e., the maxima lie in co-planar circles or annuli which are perpendicular to the axis of the fiber. FIGS. 4, 5, and 6 include graphic representations showing alternatives available for producing indexes of refraction that have variations in magnitude which depend (e.g., functionally) on the radius r from the axis 22 to the outer radius $R_1$ of the core 12. Variation A is constant with radius. Variation B is simply a monotonic, e.g., substantially linear, increase from the axis to radius $R_1$. Variation C monotonically decreases in value. Variation D shows an increase from the core axis to a peak at the radial position r' substantially equal to ½ $R_1$, with a return at radius $R_1$, to the value at the axis. Variation E is the mirror image of variation D, with the lowest value of the index of the fringe, rather than the highest, appearing at position r'. It should be appreciated that even the lowest index values represented in FIGS. 5 and 6, are nevertheless higher than the nominal index of the core.

Each of the variations shown in FIGS. 5 and 6, depends on the distance in the direction r shown in FIG. 4, keeping in mind that the variable r shown in FIG. 4 projects along a substantially disc-like, planar, preferably circular surface of a zone which is perpendicular to the axis of the fiber or device. In FIG. 3, each of the zones 18a,18b defined by the fringe maxima is shown as a vertical solid line. If each zone in FIG. 3 had a variation of the type shown as curve D in FIG. 6, then the maximum index in each zone, would be located at substantially the same radial distance r' from the axis.

It should be understood that in the present description, a sequence of fringe maxima such as the four spanned by the interval 24 shown in FIG. 3, can be considered a group of zones. The optical fiber or device 10 can therefore be considered as having modulations in the longitudinal index of refraction, wherein the modulations are defined by a group of longitudinally spaced zones, each one of the zones having a measurably different index of refraction than the "spaces" 26 on either longitudinal side of each zone. As shown in FIG. 3, the spaces between the zones can be uniform, but as will be described with greater detail below, these spaces can with the present invention be made non-uniform. These zones are contiguous and seamless with respect to each other. This invention uniquely offers control over both fringe pitch and amplitude on a group-to-group basis.

The following description of implementing hardware is made with reference to FIGS. 7–12 and pertains to direct imaging of an optical fiber via a traveling interferometer imaging system 100. By logical extension, this same system and technique could be used to image other optical media either by direct exposure or by exposure of a photoresist coating followed by conventional lithographic processing.

Figure 7:
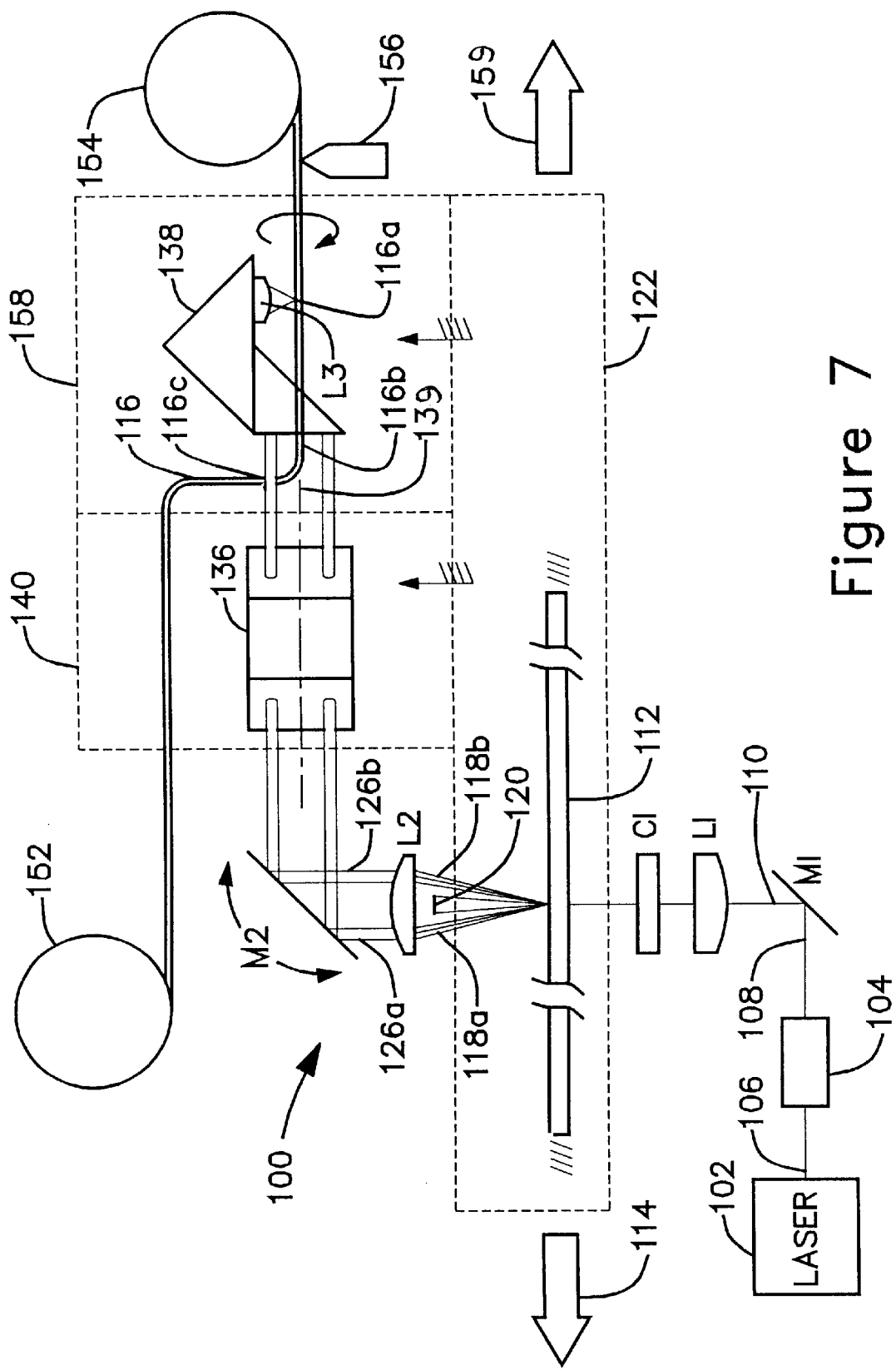
FIG. 7 is a schematic representation of a system according to the invention, for imaging circularly symmetric DBR images on an optical fiber that is fed from its supply reel to a take up reel.

In the preferred embodiment as represented in FIG. 7 an actinic laser light source 102 is used. This is a source of semi-coherent laser light in the appropriate UV portion of the spectrum. By further illustration, this might be a diode pumped, frequency quadrupled, coherent light output of a Vandate or Yttrium Aluminum Garnet (YAG) laser crystal followed by a quadrupling crystal (or equivalently two serial doubling crystals) which emits 250 milliwatts of power at 266 nanometers in continuous wave (CW) output mode. Alternatively, frequency doubled dye lasers pumped by an Excimer laser can be used effectively to expose these fibers with actinic radiation. This preferred laser light source could be replaced with alternative sources, including pulsed lasers, which have sufficient coherence, brightness, and spectral distribution for this application.

Figure 15:
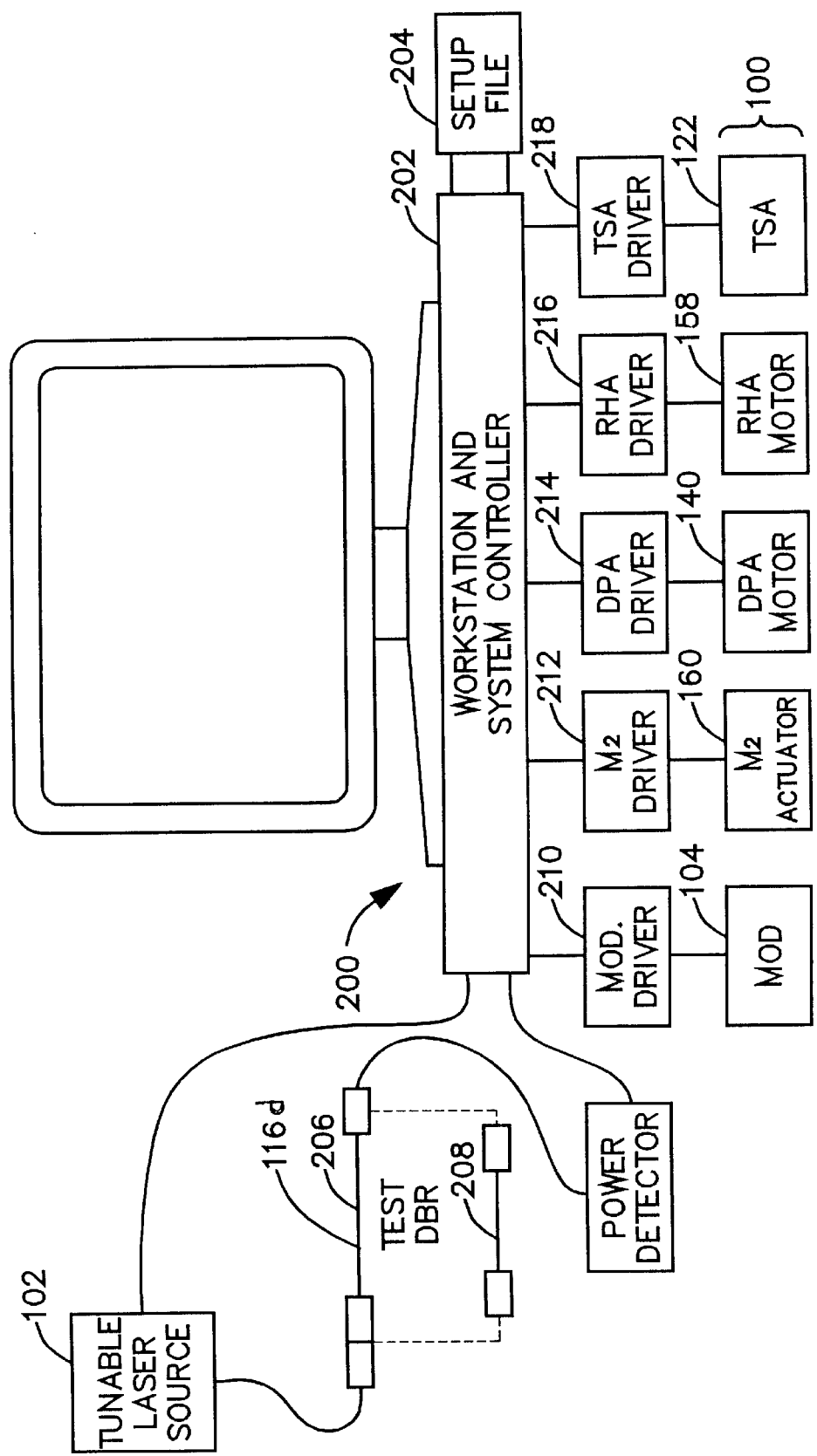
FIG. 15 is a schematic representation of the components associated with a design and control sub-system for the imaging system shown in FIG. 7.

A modulator 104 follows the laser, to control the amplitude of the light 106 under the synchronized direction of the system controller (FIG. 15). The preferred modulation device 104 is an acousto-optic modulator fabricated from fused quartz. This device can be operated in either the "0" order or loss modulation mode or in the +1 order or gain modulation mode. This device would be characterized by typical optical efficiencies exceeding 85% and modulation bandwidths exceeding 100 KHz.

The light beam output 108 of the modulator 104 is folded 110 by mirror M1 and directed at spherical lens L1 and cylindrical lens C1. These lenses form an anamorphic spot on the surface of phase mask 112. In the preferred embodiment, the focal length of these lenses is selected to form an optical spot of Gaussian intensity distribution (in both axes) at a size of about 15 microns in the longitudinal (or grating) direction 114 followed by about 50 microns in lateral (or cross-grating) direction. Those skilled in the art will recognize that there are many combinations of lenses and optical beam diameters which will accomplish such a result and that those preferred results can be further modified and adjusted to accomplish desired variations of implementation. This mask 112 lies in an orientation parallel to the grating direction and is an optical grating at the nominal pitch of the resultant DBR to be produced in fiber 116. In the preferred embodiment the mask consists of sinusoidally alternating thickness variations (i.e. mask fringes) at twice the nominal pitch $\Lambda_o$ of the DBR. This mask generates two equal intensity diffracted optical beams 118a,118b. Alternatively, those familiar with the art will recognize that this mask 112 could be constructed of alternating indexes of refraction, a triangularly or square varying thickness pattern, or constructed as an amplitude mask. An aperture stop 120 follows the mask to block all diffracted orders other than the desired +1 and −1 order.

In the preferred embodiment, all of the optical elements with exception of the phase mask 112 are fixed in position. The phase mask (together with the rotating dove prism assembly and rotating record head assembly to be described subsequently) are mounted on a translating slide assembly (TSA) 122 which provides motion in a single axis in the direction 114 of the gratings.

Figure 8:
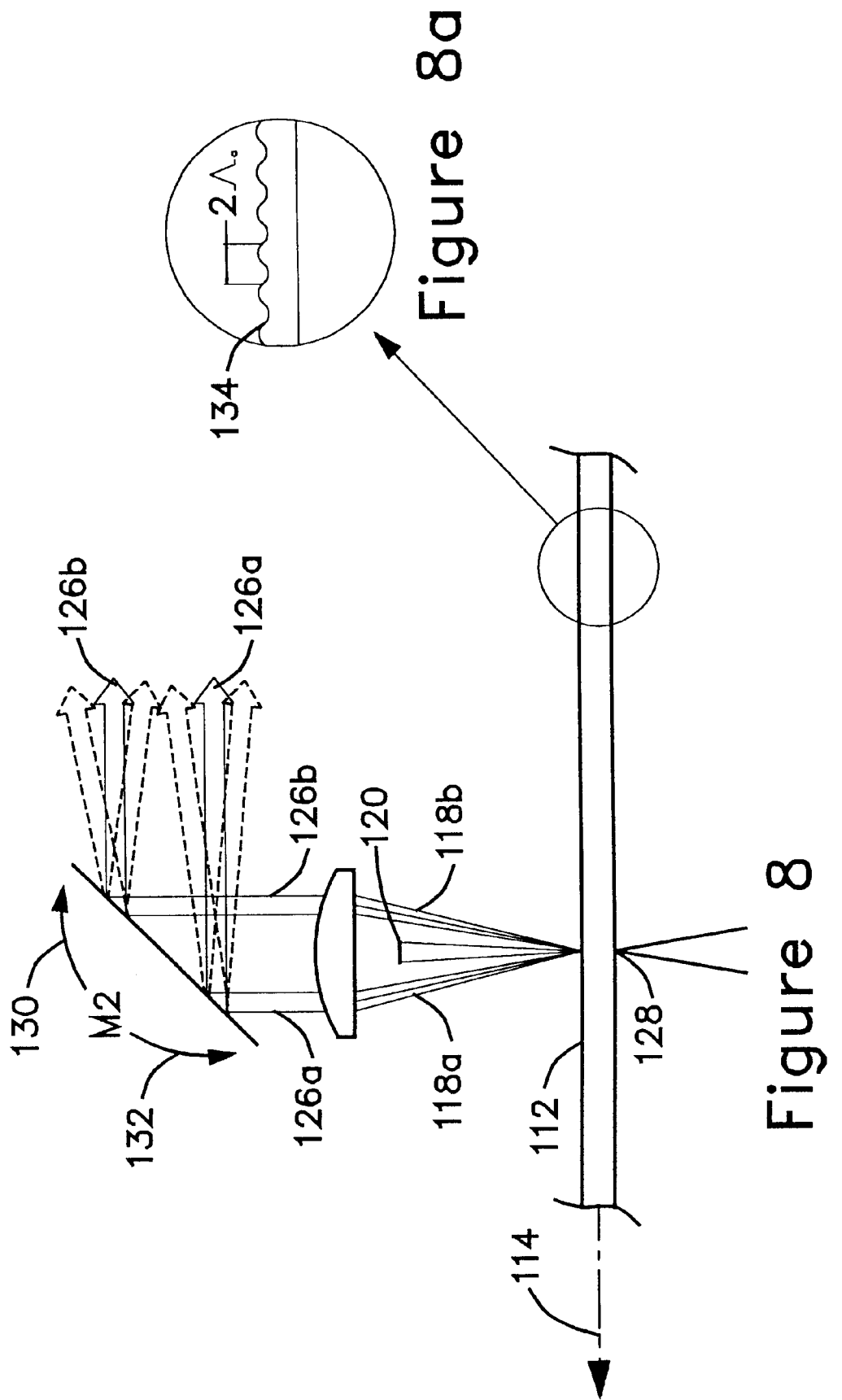
FIG. 8 is a detailed view of the tiltable mirror portion of the system shown in FIG. 7.

With reference also to FIG. 8, in the preferred embodiment, a second spherical lens L2 follows the phase mask 112. This lens (nominal focal length of 15 mm) is selected to form two collimated beams 126a,126b of nominally 0.34 mm in the grating direction and nominally 0.1 mm in the cross grating direction. A constant nominal distance of 8.3 mm separates the centerlines of these two beams. This lens is followed by another fold mirror, M2, which folds the optical path by 90° to be nominally parallel to the direction 114 of the translating slide assembly. In this preferred embodiment all of the optical elements L2 and M2 are nominally stationary in position and do not translate on the TSA.

Mirror M2 is equipped with a controllable tilt feature such that the angle of reflection in the grating direction can be controlled. This control can be implemented in extremely small increments using available technology such as the Newport U200-A mirror mount equipped with a Newport ESA micromanipulator under the control of a Newport ESA-C driver which is interfaced to the system controller (FIG. 15). During the advance of the phase mask through the illumination spot 128, changing the tilt M2 in the phase mask motion direction 130 via the micromanipulator has the effect of retarding the apparent motion of the phase mask fringes 134. Conversely, changing the tilt of M2 opposite 132 to the motion direction has the effect of advancing the apparent motion of fringes.

Figure 9:
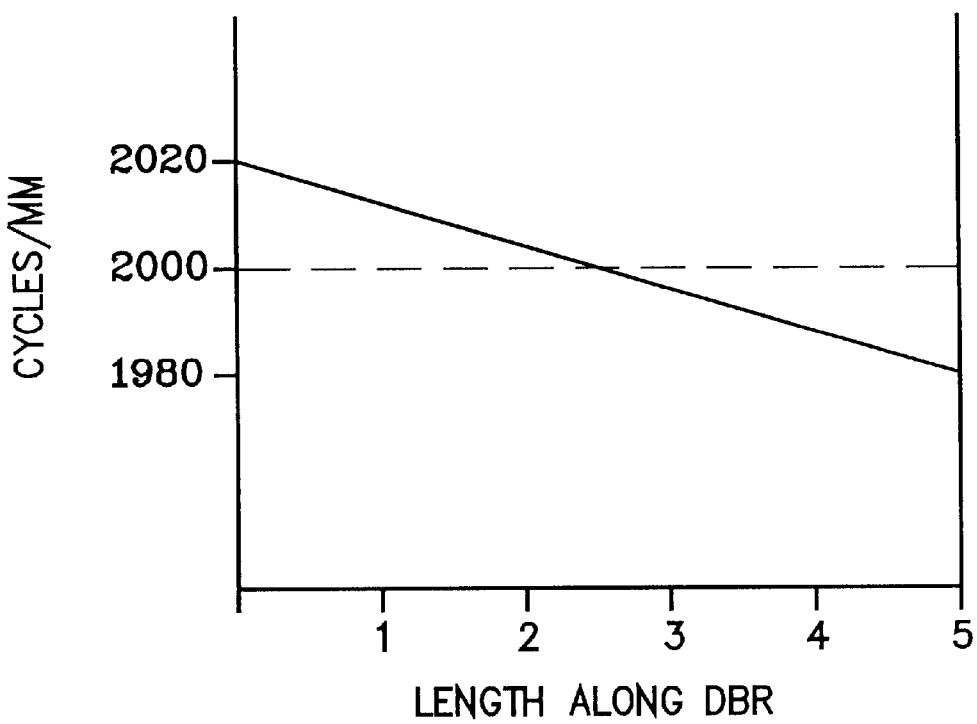
FIG. 9 is a graphic representation of the use of the system shown in FIG. 7 to produce a monotonically decreasing (chirped) fringe pitch along the grating direction.
Figure 10:
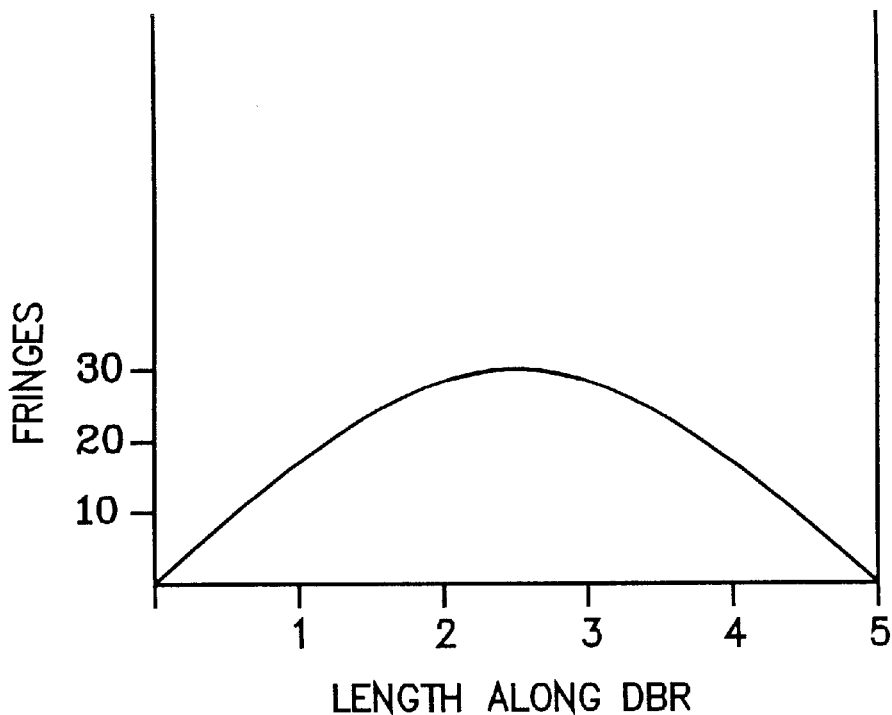
FIG. 10 is a graphic representation of the cumulative fringes added to the nominal pitch phase mask to create the chirped pattern represented in FIG. 9.

For purposes of illustration in this preferred embodiment, let the pitch of the phase mask, $2\Lambda_o$, be nominally constant at 1.0 microns, the length L of the DBR be 5 mm, and let L2 have a 15 mm focal length. In this illustration the goal of imaging the desired DBR is to produce a grating with a linear 2% (or 300 Angstrom) chirp centered about 0.5 microns. Therefore, this DBR will have a pitch linearly varying from 2020 cycles/mm to 1980 cycles/mm over the length of 5 mm, as illustrated in FIG. 9. In order to fabricate this chirped DBR, DBR fringes will need to be added at the leading end (2020 c/mm) at a progressively slower rate until no fringes are added at the center crossing followed by fringes being retarded starting at the center and increasing until the 1980 c/mm end is reached. The number of cumulative fringes added to the constant 0.5 mm pitch phase mask to create the chirped DBR is shown in FIG. 10. Twenty five DBR fringes is the maximum number of fringes that were required to be added in this illustration.

The M2 angular change that is required to add a DBR fringe is given by:

$\phi = atan(2\Lambda/F_2)$ where $\phi$ is the angular increment for a single DBR fringe change $2\Lambda$ is the pitch of the phase mask and $F_2$ is the focal length of the lens In the preferred embodiment this angular increment is approximately 33 microradians for a one fringe change. This preferred configuration is able to provide angular adjustment at a much finer increment (e.g., 0.1 microradian). Then, during the travel of the TSA, the mirror M2 will be adjusted in these small increments creating a smooth variation of the adjusted pitch of the fabricated DBR. This pitch is adjusted during fabrication under the control of a system controller that is using pre-calculated values for the fringe amplitude and spacing and for the motion of the mirror M2 that controls that fringe spacing. This small incremental motion of M2 will support the fabrication of a 1 angstrom chirped DBR with a linearity error of less than 1%.

It is significant to note that motion of mirror M2 is required to modify the fringe spacing. If the mirror M2 is left stationary in any position, there will be no adjustment to the recorded fringe spacing over the "raw" fringe spacing of the phase mask. Those familiar with the art will recognize that this fringe controlling feature of mirror M2 can be implemented in a variety of alternative ways such as but not limited to rotating plane parallel plates located between the focused spot 128 on the phase mask 112 and L2, rotating prism assemblies, translatable lens L2, and controlled micromovement of the phase mask with respect to the TSA. In the preferred embodiment, there is a common linear motion of the phase mask 112, the dove prism assembly 136, and the rotating head assembly 138. Alternatively, motion of the phase mask can be replaced with the motion of mirror M1, lens L2, cylinder lens C1, lens L2, and controllable mirror M2, all in combination.

Figure 11:
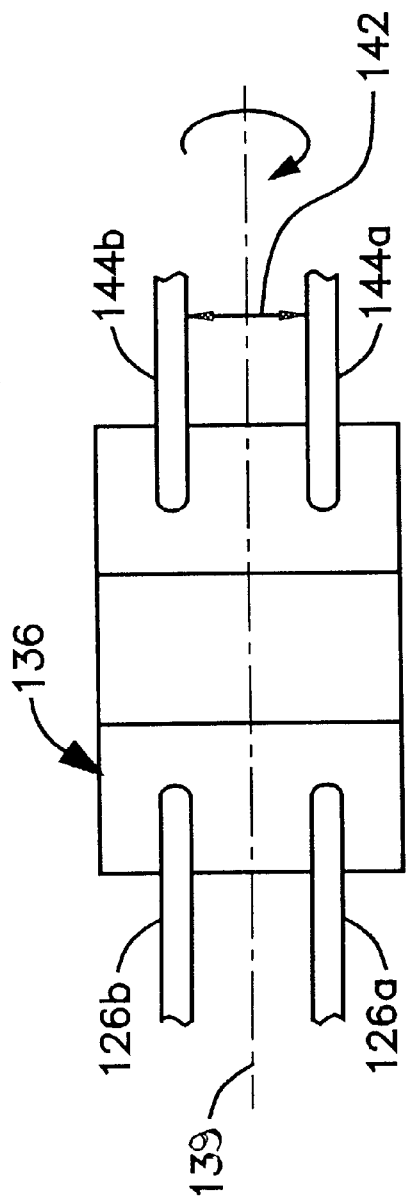
FIG. 11 is a top view of a dove prism assembly component of the system as depicted in FIG. 7.
Figure 12:
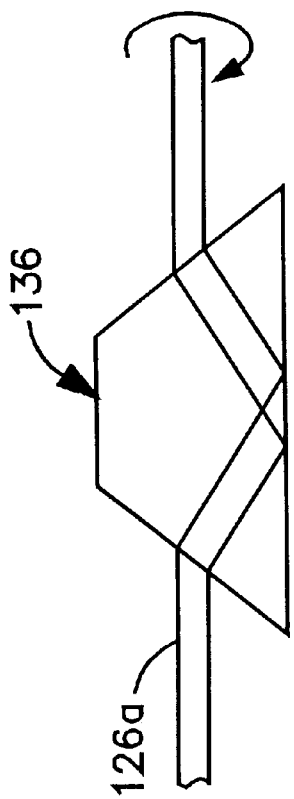
FIG. 12 is a side elevation view of the dove prism of FIG. 11.

With further reference to FIGS. 11 and 12, the two diffracted beams 126a,126b then enter a dove prism assembly (DPA) 136. This DPA is nominally centered on the optical axis 138 of the fiber 116 as positioned 116a for creation of the DBR fringes. The DPA 136 is mounted to and within a motor 140 (indicated in phantom lines) that provides rotation of the DPA about the nominal optical axis.

(Such rotation is also referred to herein as "axial rotation"). This motion is supported by a motor driver and is under the synchronized control of the system microcontroller. This motor and DPA are further attached to the translating slide assembly 122 that provides motion 114 in the z-axis (i.e., parallel to workpiece axis). At any rotational angle of the DPA, the collimated beams 126a,126b emerge from the DPA with a minimum separation or gap 142 therebetween.

Figure 13:
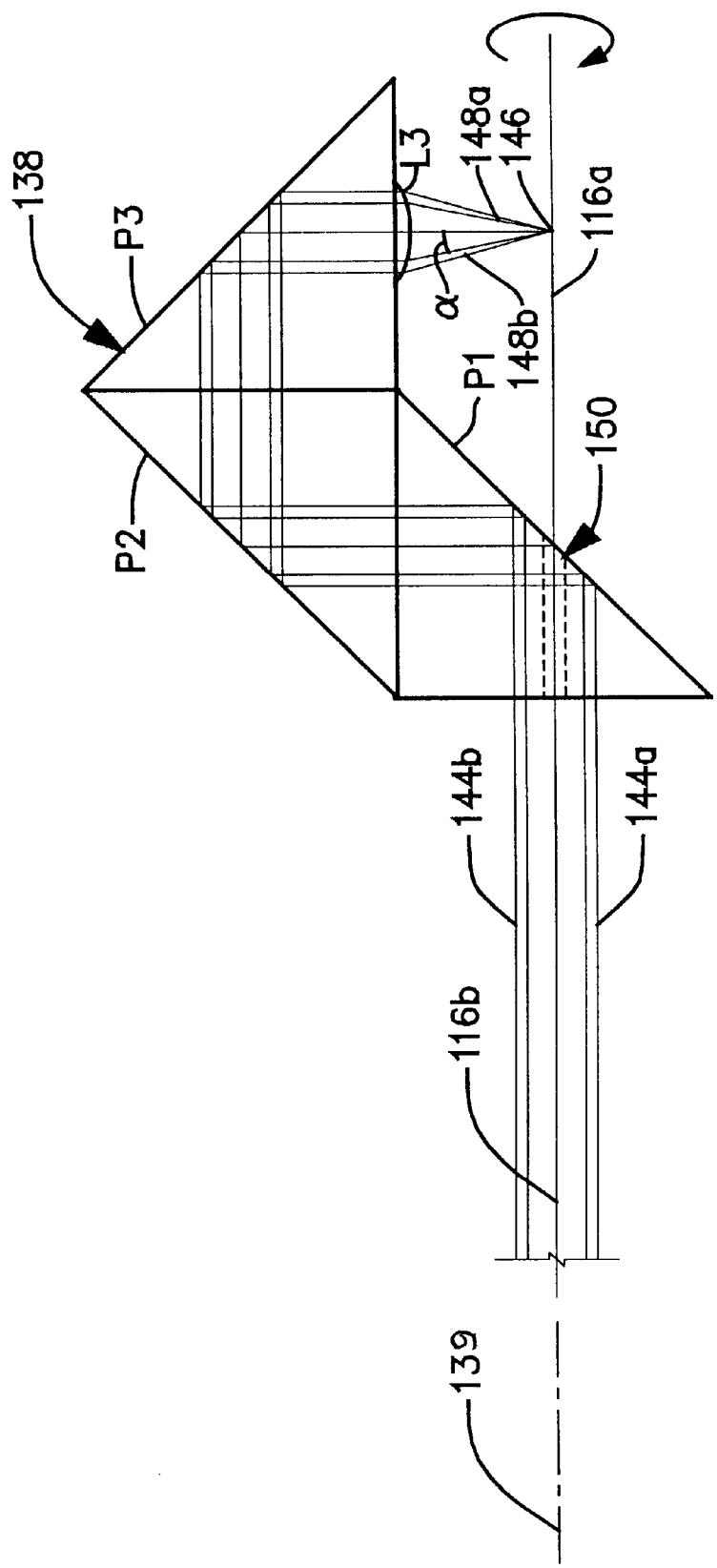
FIG. 13 is a side elevation view schematic of the recording head assembly component of the system shown in FIG. 7.

FIG. 13 further illustrates the preferred embodiment of the recording head assembly (RHA) 138. In this embodiment, the RHA comprises another spherical lens, L3, and a series of right angle prisms P1, P2, P3 that fold the optical path as shown. The lens, L3, is selected to have a nominally matching focal length to the previous spherical lens, L2, which is 15 mm in the preferred embodiment. The spacings, thicknesses, and positions of the lens and prisms are selected so that the beams 148a, 148b converge at angles α and interfere to form an optical spot 146 of nominal size 15 microns in the grating direction and 50 microns in the cross grating direction within the center of the nominal 100 micron fiber 116a. The relatively large depth of optical focus provides a high degree of immunity to varying fiber diameters and mis-position of the fiber or beam. The preferred RHA configuration illustrated in FIG. 13 could be modified by those skilled in the art with a variety of combinations which replace prisms with mirrors, move the location of the lens along the optical path including between prisms or mirrors, and which replace the function of the lens with a holographic optical element, curved mirror, gradient index optic, or other element which causes the light to come to an optical focus.

FIG. 7 for the preferred embodiment illustrates the relative positions and mounting of the phase mask 112, the rotating dove prism assembly 136, and the rotating recording head assembly. These are co-mounted on the translating slide assembly 122 and thereby move commonly and together as a unit. The translating slide assembly in the preferred embodiment includes a compressed air supported carriage traveling along a linear guide rail together with a forcing or driving linear motor. Those familiar with this art will recognize that such linear TSA's, together with the linear motors, drive electronics, and motion controllers are commercially available from manufacturers such as Dover Precision, Anorad, and NEAT, among others. The linear position of the carriage is continuously measured by a linear interferometer such as the Zygo Axiom or equivalent that provides position feedback to a precision of $2.5 \times 10^{-3}$ microns. This TSA motion system is under the control of the system microcontroller (FIG. 15).

Those familiar with the art of optical interferometry will recognize that the co-location of these elements as illustrated in the preferred embodiment is particularly useful. When the rotating dove prism assembly 136 is driven at an angular velocity equal to one half the angular velocity of the rotating record head assembly 138 and is phase locked appropriately, the fringes formed at 146 by the imaging process are fixed in position both during the rotation of the RHA around the fiber and during the motion of the TSA. Moreover, the fixity of the fringes is unaffected by the velocity or position of the TSA carriage along the rail.

A recognized limitation of this approach of a traveling interferometer is the size of the traveling spot 146 as opposed to the extent of change of the fringe pitch constant. If the rate of change of the fringes generated by the interference of these actinic beams is excessive, the incoherent addition of the fringes will cause smearing or erasure of the newly written fringes as the "tail" of the overlap region passes over it. As a rough guideline:

$$(d\Lambda/\Lambda)\omega_{spot} < \Lambda/4$$

where $d\Lambda/\Lambda$ is the pitch rate of change $\omega_{spot}$ is the spot diameter ($e^{-2}$) and $\Lambda$ is the pitch In the case of the preferred embodiment, this guideline places an upper limit of 3% on the pitch rate change, which is substantially more than is required for typical quasiperiodic gratings. This system is configured in the preferred embodiment to produce quasiperiod (or chirped) gratings with chirp rates which vary between 1 Angstrom and 200 Angstroms along the length of the DBR (nominally 10 mm in length) with an error in chirp linearity of substantially less than 5%. The previously described angularly actuated adjustable mirror M2 provides this control of pitch change over the range of at least −1.3% to +1.3%. Since this upper rate of change can be applied nominally every 15 microns (the size of the optical spot 146 in the grating direction) in this preferred embodiment, this limitation is inconsequential to the application of imaging DBR's in practice. In fact, this preferred embodiment exhibits the control and freedom to fabricate DBR's having specific desired transmission response characteristics without practical limitation.

In FIG. 13 of the preferred embodiment, the RHA 138 is shown to have a clear access aperture or bore 150 which extends along the optical (z) axis 138. This clear aperture continues through both the drive motor and the rotary feedback encoders so as to provide effective mechanical clearance about the optical axis. This clearance, in the preferred embodiment, is assigned to provide effective "threading" of the optical fiber portion 116b along the z-axis. The gap in the collimated beams upstream of the RHA also accommodates the fiber. In this configuration, the fiber portion 116a is clamped in position during the writing operation, and advanced upon completion. As is typical of DBR's, the exposed fiber is approximately 6 to 10 mm in length which sets the required travel range of the TSA. In this preferred embodiment, the modulator would be "blanked" during the period when either one of the rotating pair of beams encounters the optical fiber portion 116c laterally crossing its path (see FIG. 7).

Figure 14:
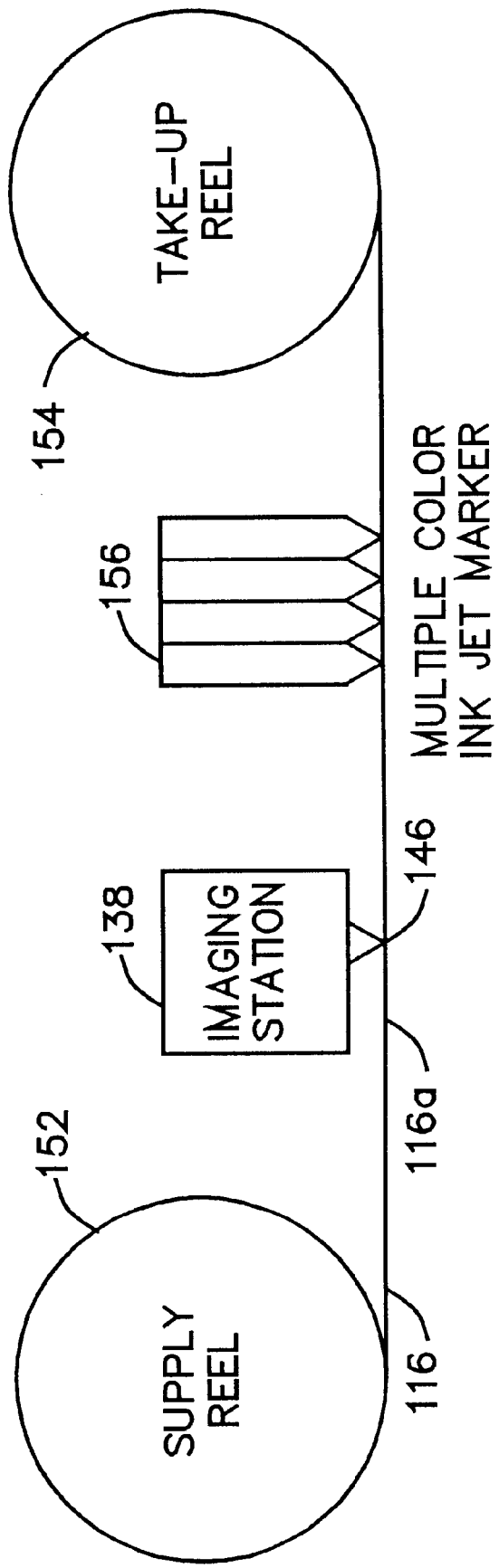
FIG. 14 is a schematic representation of the fabrication of custom DBR grating devices, with each device receiving a marker while it is still part of the continuous fiber played from the supply reel to the take-up reel.

FIGS. 7 and 14 show the details of a device for marking the fiber in the "reel-to-reel" automated fabrication system of FIG. 7, with a code which indicates the demarcation between imaged DBR's along the fiber 116, the type of DBR which is adjacent to the mark, and additional markings as appropriate. These additional marks may be used to indicate the type of fiber, date of manufacture, plant where fabricated, channel assignment, customer, or other manufacturing data as required by the DBR fabricator. The preferred embodiment utilizes an ink jet marker 156, by which control of color and dot placement are readily adaptable to such marking requirements. The general sequence of imaging in series along a continuous fiber 116 advanced in direction 158 from supply reel 152 to take-up reel 154 is that (1) the fiber portion 116a is unclamped and advanced by some set distance sufficiently large for the fabrication of a DBR, marking, and subsequent connector terminations (e.g., 100 mm); (2) the fiber portion 116a is clamped in position; and (3) the fiber portion is imaged and marked (a DBR is fabricated).

It is also understood by those familiar with the art that additional alternatives are equally feasible. These include the less desirable option of replacing the motion of the DPA and the RHA with motion of the actual fiber.

As previously described, the position and registration of the fringe is independent of the speed and position of the TSA 122. In the preferred embodiment, the RHA 138 and the DPA 136 will be in constant rotation during the record process, thereby ensuring a uniform and smooth exposure around the fiber (i.e., it is a helical recording process). The advance (or pitch) of this helix is a variable which can be chosen at will. Those familiar with the art will recognize that the system as described will record DBR's effectively across a wide range of helix pitches: from 0.1 micron of RHA 138 advance per revolution to infinity (no RHA rotation during recording).

For purposes of illustration with reference to FIG. 7, the helix pitch will be assumed as set to 1 micron. Further, the 250 mW UV laser 102 will support an exposure rate of approximately 0.1 mm/sec. Therefore, in this embodiment, the RHA rotational rate will be 100 revolutions/sec and the DPA will be 50 revolutions/sec. The typical recording time for a 6 mm DBR will be 1 minute. Further, the preferred embodiment will assign values to the pitch and amplitude matrix of the specific DBR design to be fabricated every 1 micron of longitudinal travel. The data that controls the fringe pitch and the amplitude of the recorded fringes longitudinally along the DBR is provided by the design system.

This design system 200, illustrated in FIG. 15, is implemented with computer programs residing on a computer workstation 202. For purposes of illustration, this workstation has a Pentium or Pentium II class of processor running under Microsoft Windows NT or similar operating system. The purpose of the design system is to provide the designer a flexible environment by which a DBR with desired properties of transmission response can be effectively designed for the application of interest in telecommunications or remote sensing or some other field of interest. A further objective is to maintain a set of imaging performance data for the imaging system herein described when operated at a specific system setting which represents a combination of fiber type, exposure settings, record linear velocity, pitch helix, and other relevant parameters. This set of imaging performance data is used both to quickly return the system to a known working setting and also to predict the response of the imaging system 100 to the forthcoming DBR design. This predicted system response (imaging system modulation transfer function or MTF to those familiar with this art) is developed with calibration operations during the setup of the imaging system for specific optical fibers. This predicted imaging system MTF is of great utility since the design system software application can use it effectively to produce DBR's which must more closely meet the performance objectives of the designer.

It may be appreciated that the control system 200 would typically include specially adapted driver programs, in particular, driver 210 for the modulator 104; driver 212 for operating the actuator 160 on tilt mirror M2; driver 214 for operating the DBA motor 140; driver 216 for operating the RHA motor 158; and driver 218 for operating the TSA 122. It is well within the skill of the ordinary practitioner in this field to acquire and if necessary program the drivers identified above, and to acquire and connect the equipment and components operated by the drivers. Similarly, any computer programming that may be required to define the user interface and the linkages among the various drivers and components, would be within the ordinary skill of such persons.

By way of further illustration in the preferred embodiment the sequence of production is as follows:

1—The system is configured through the design application menu and the variables of fiber type, exposure settings, record linear velocity, pitch helix, and other relevant parameters are selected. A set of all these selected variables are kept in a record in "setup" file stored at 204. Multiple setups can be configured and characterized at will.

2—A test recording of a DBR 206 is made on a section of the same optical fiber as intended for production, at a specific setup (combination of fiber type, exposure settings, record linear velocity, pitch helix, and other relevant parameters as selected) using an available set of DBR pitch and intensity data from a calibration design DBR 208.

3—The calibration design DBR 208 at this setup is measured and characterized using an instrument such as a HP external cavity tunable laser source Model 8168A/F and power detector.

4—The actual performance data of DBR 206 is compared with the calibration DBR 208 design and the system MTF is calculated for this setup.

5—This calculated MTF is then used to predict the performance of the subsequent production DBR when fabricated with this setup.

6—The MTF can be further used to adjust the production DBR pitch and amplitude data using Fourier transform processing calculations as known in the art. This will force the DBR as produced at this setup to more closely match the DBR design target.

This technique as outlined herein can be effective at designing and quickly producing custom DBR's with quasiperiod gratings. This technique is particularly effective at reducing the "trial and error" of the earlier manually intensive techniques.

Figure 16:
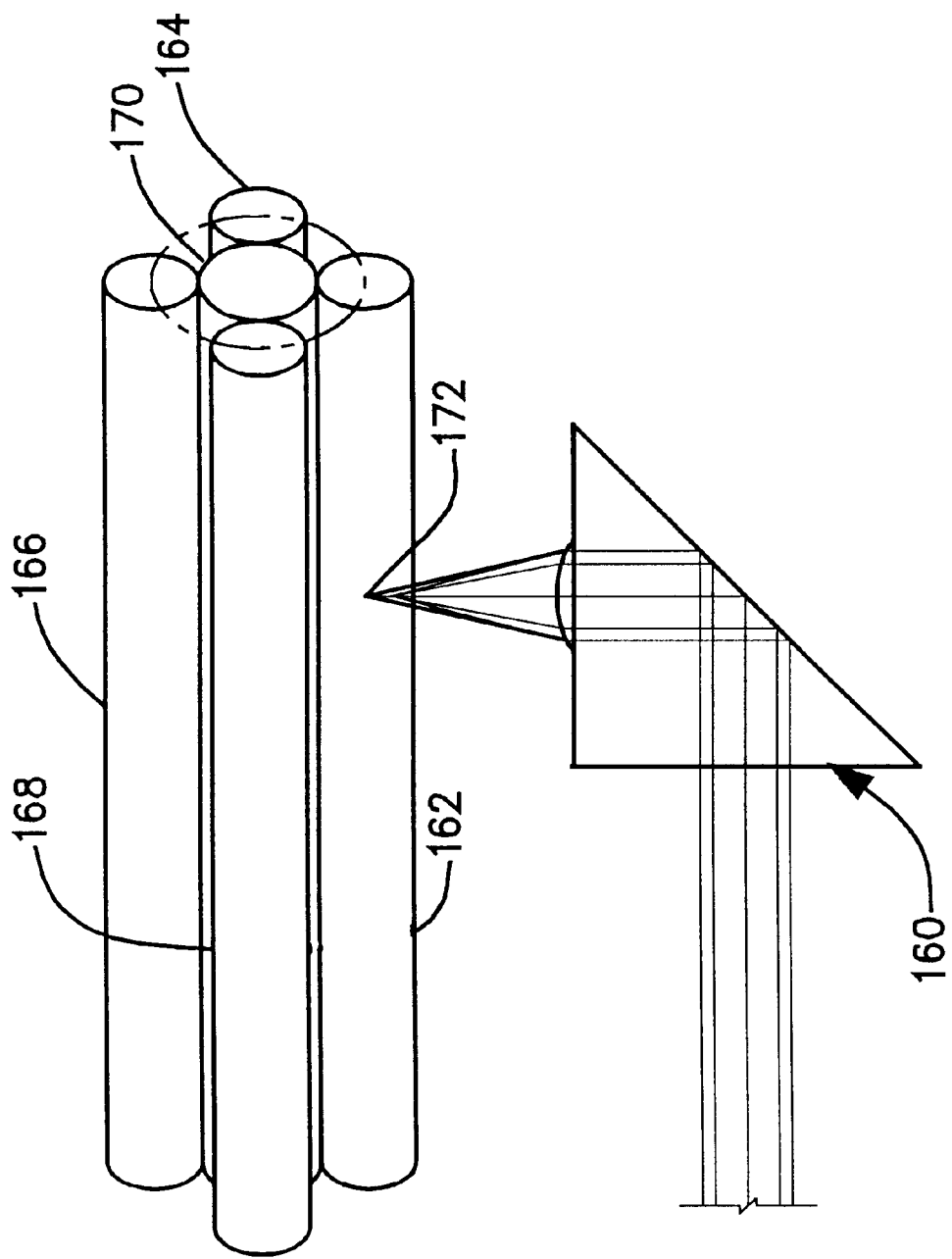
FIG. 16 is a schematic of an alternative recording head assembly for use with imaging multiple fibers.

A first alternative travelling interferometer system is similar in all regards to the system described with respect to FIGS. 7 and 13, except the RHA 138 is modified. This modification allows the focus of the spot 146 to be formed not on the optical axis 138, but on the surface of an imaginary cylinder. This RHA 160 is depicted in FIG. 16. The imaging geometry allows for the imaging of multiple fibers 162,164,166,168 arranged side-by-side around the surface of a cylinder 170. The traveling interferometer is configured to have the focus of the spot formed by the two beams nominally aligned with the center 172 of the fibers distributed around the circumference of the cylinder. During the imaging operation all of these optical fibers are clamped into fixed position by a clamping mechanism (not shown). The alternative system is also distinguished in the routing of the optical fibers into the imaging station. The system of FIG. 7 requires a coaxial routing of a single fiber. The alternative system does not use coaxial routing and additionally images multiple fibers. Therefore, the RHA does not require mechanical clearance about the optical axis. The RHA configuration illustrated in FIG. 16 could be modified by those skilled in the art with a variety of combinations which replace the prism with a mirror, move the location of the lens along the optical path including before the prism or mirror, or replace the function of the lens with a holographic optical element, curved mirror, gradient index optic, or other element which causes the light to come to an optical focus. Those familiar with the art will also recognize that because substantially more area is optically scanned by the alternative configuration, for the same longitudinal motion of the TSA, there is a higher requirement for optical power. However, this does not present a problem in view of recent advances in available coherent laser power in this UV spectrum and in the construction and sensitivity of optical fibers.

A second alternative system is similar in all regards to the first alternative system, except the scan arc is limited in extent. Instead of the full circumference of a circle, the scan arc can be in the range of, e.g., 90°–270° to accommodate a more limited quantity of optical fibers to be imaged as DBR's. This system can include a "back and forth" sweeping motion, where the scanner stops and reverses direction at the end of each scan. During the time of stopping and reversing of direction, the TSA can be incrementally advanced. Those familiar with the art will recognize that this imaging process can be implemented by a wide variety of techniques, e.g., monodirectionally, bidirectionally, sinusoidally, step and settle, etc.

Figure 17:
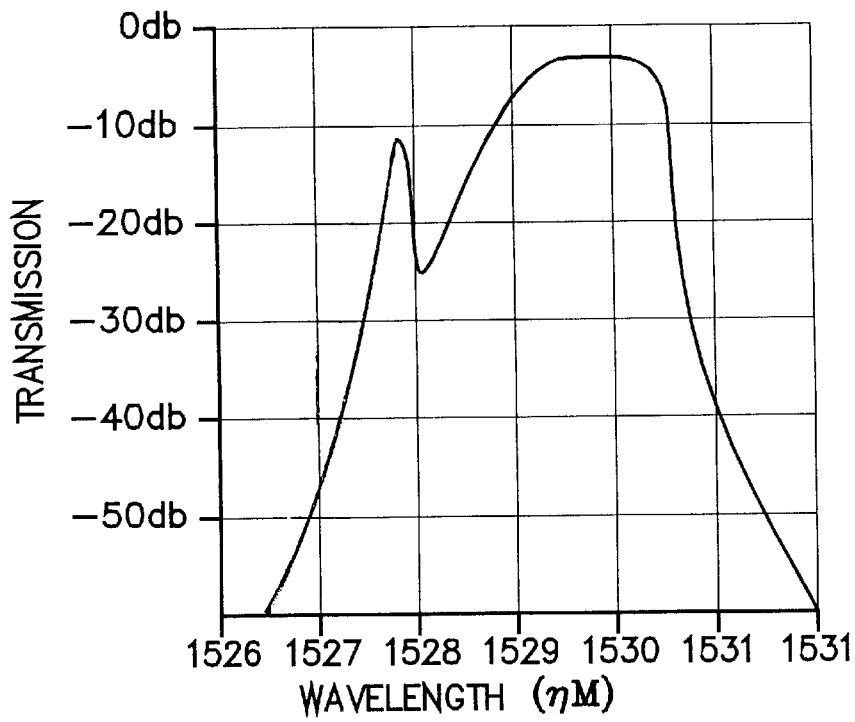
FIG. 17 is a graphic representation of one transmission characteristic that can be achieved with the imaging according to the present invention.
Figure 18:
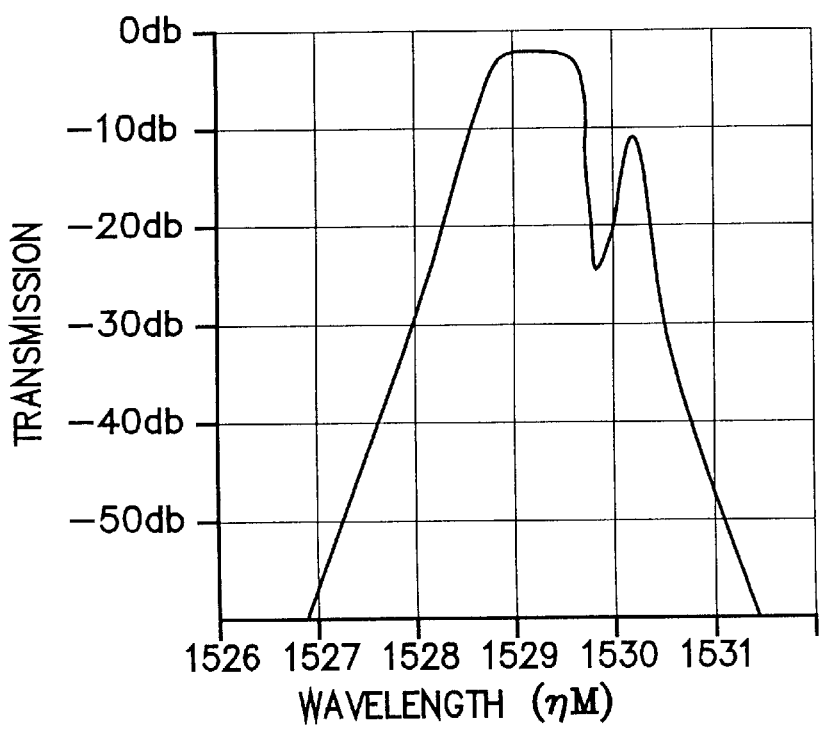
FIG. 18 is a graphic representation of a second transmission characteristic usable in conjunction with the transmission pattern shown in FIG. 17, for together achieving a particularly advantageous pattern for use in communications systems.

Further advances in telecommunications, remote sensing and other applications of Wavelength Division Multiplexing (WDM) technology are anticipated which will require complex and intricate control of the desired passband transmission characteristic. An example of this is given in FIGS. 17 and 18 which show a center passband with a small additional sideband at the low wavelength and high wavelength side, respectively. A pair of DBR's of this type could be highly effective in sensing drift in the center wavelength and then enabling a closed-loop correction of the center wavelength as understood by those who are familiar and skilled in this art. The transmission in the main region is greater than 90%, has a wavelength range of transmission greater than 5 nm, and an optical transmission attenuation outside the main region greater than 20 db, followed by a secondary transmission region separated from the first region by a distance approximately equal to the width of the main transmission region. The secondary transmission region is characterized by a secondary transmitted wavelength that is either longer or shorter than the wavelength transmitted in main transmission region, a wavelength range of transmission that is no greater than that of the main region, and a secondary transmission attenuation in the secondary region which is less than 20 db from the main transmission region.

In another embodiment gratings are formed in optical wave guide media and exhibit the properties of a main wave length transmission region and a secondary "band stop" non-transmission region. Transmission in the main region is greater than 90% over a wavelength range greater than 5 nm, with an optical transmission attenuation outside the region greater than 20 db. A secondary "band stop" nontransmission region within the wave length range of the main region is provided wherein the band stop non-transmission wave length range is less than 1 nm and the peak attenuation is greater than 15 db.

Those familiar with this technology would recognize additional benefits of the present invention. A DBR made according to the invention could be readily designed to provide compensation for the non-linear gain of an Erbium fiber pump laser as is commonly used in long-haul telecommunication systems. A DBR according to the invention could be readily designed to provide compensation for dispersion of signals in the present long-haul telecommunication systems. For potential additional advantages that may arise in the use of DBRs fabricated in polarization preserving but none-symmetrical fibers, the exposure amplitude according to the invention could be readily controlled as a function of the radial position around the fiber (as well as the longitudinal position along the fiber) thereby producing, e.g., an elliptical or other shape.

I claim:

1. In a method for imaging light transmitting media oriented along a workpiece axis by directing two co-propagating coherent light beams having known beam amplitudes and beam pitch at the media transversely to the workpiece axis so that the beams interfere to produce a permanent fringe pattern in the media having a commensurate fringe amplitude and fringe pitch, the improvement comprising:

(1) directing the co-propagating coherent beams parallel to said workpiece axis;

(2) redirecting the beams from a direction parallel to the workpiece axis to a direction perpendicular to the workpiece axis while maintaining said beam pitch;

(3) further redirecting the beams from a direction perpendicular to the workpiece axis to respective converging directions whereby the beams interfere to produce a fringe pattern in the media;

(4) synchronously rotating the coherent beams of steps (1) and (2) and the converging beams of step (3) about the workpiece axis, thereby producing a pattern of substantially circularly symmetric fringes in the media.

2. The method of claim 1, wherein the redirected, converging beams are interrupted intermittently and translated relative to the media in parallel with the workpiece axis, thereby producing a permanent fringe image consisting of a plurality of axially adjacent fringe patterns.

3. The method of claim 1, wherein the rotating beams are translated relative to the media in parallel with the workpiece axis.

4. The method of claim 1, wherein the media is a single linear strand extending coaxially along the workpiece axis.

5. The method of claim 4 wherein the strand is fed continually on the workpiece axis between the beams of step (1), from a supply reel located laterally of the beams.

6. The method of claim 3, including continually changing the beam pitch of step (1) during the translation of the beams relative to the media, thereby producing an image with non-uniform fringe pitch in the media.

7. The method of claim 6 wherein a single strand of media is fed continually on the workpiece axis between the beams of step (1), from a supply reel located laterally of the beams.

8. The method of claim 7, wherein a multiplicity of spaced apart fringe images are produced along the strand of a given reel, some of the images having different properties from others of the images, and the method following step (4) includes marking the strand adjacent each image, with indicia indicative of the properties of each image.

9. The method of claim 1, wherein the media comprises a plurality of media strands extending in parallel with and symmetrically about the workpiece axis; and step (3) produces a fringe pattern through the surface of each strand.

10. The method of claim 9, including translating the rotating beams relative to the media parallel to the workpiece axis and continually changing the pitch of step (1) during the translation of the beams relative to the media, thereby producing an image with non-uniform pitch in the media.

11. The method of claim 2, including continually changing the beam pitch of step (1) during the translation of the beams relative to the media, thereby producing an image with non-uniform fringe pitch in the media.

12. The method of claim 3, including continually changing the beam amplitudes of step (1) during the translation of the beams relative to the media, thereby producing an image with non-uniform fringe amplitudes in the media.

13. The method of claim 12, including continually changing the beam pitch of step (1) during the translation of the beams relative to the media, thereby producing an image with non-uniform fringe pitch in the media.

14. A method for modulating the longitudinal index of refraction along an optical fiber that is positioned as a workpiece along a workpiece axis extending in a first direction, comprising:

projecting a source of actinic light parallel to said first direction;

modulating the projected source of light to generate a beam of actinic light traveling in the first direction and having a known amplitude;

folding the beam of modulated light toward a phase mask defining the nominal pitch of the desired modulations to be formed in the fibers and thereby;

producing two diffracted beams of nominally equal intensity;

blocking all diffracted orders in the diffracted beams, except the +1 and −1 order;

passing the ordered beams through lens means to form two collimated beams having a predetermined cross sectional shape and a nominal separation distance;

folding the collimated beams with tiltable mirror means to travel in a direction substantially parallel to said first direction;

passing the folded collimated beams through prism assembly means nominally centered on the workpiece axis and rotatable about the workpiece axis, such that at any rotational angle about the workpiece axis, the collimated beams emerge from the prism assembly means with a minimum gap there between;

feeding the optical fiber through the gap and into a recording head assembly which surrounds the fiber, folds the collimated beams to project perpendicularly to the fiber, and focuses the beams within the fiber;

clamping the fiber on the workpiece axis;

co-translating the phase mask, the prism assembly means, and the recording head assembly parallel to said first direction a controlled distance; and co-rotating the prism assembly means and the recording head at different angular velocities.

15. A system for imaging linear optical media, comprising:

means for splitting a coherent beam into two co-propagating optical beams;

means for converging the optical beams to produce a pattern of interference fringes having a pitch;

means for varying the pitch of the interference pattern fringes;

means for rotating the interference fringes around the linear media; and means for rotating the co-propagating optical beams so as to maintain rotary synchronism with the rotating interference fringes.

16. The system of claim 15, including means for linearly translating the means for splitting, the means for converging, the means for rotating the fringes, and the means for rotating the optical beams, in unison relative to the optical media.

17. The system of claim 15, including means for varying the amplitude of the interference fringe pattern.

18. The system of claim 16, including means for varying the amplitude of the interference fringe pattern.

19. The system of claim 17 including a control system whereby target transmission characteristics of the linear optical media are defined by a user, comprising means for computing at least pitch and amplitude coefficients for adjusting at least one of the means for varying the pitch and means for varying the amplitude.

20. The system of claim 19, including means for storing a setup file of said coefficients used to previously image media; and means for retrieving the stored coefficients and using said stored coefficients to image another media.

* * * * *